(12) United States Patent
Lee

(10) Patent No.: US 8,250,995 B2
(45) Date of Patent: Aug. 28, 2012

(54) LOG CARTRIDGE BURNING SYSTEM

(76) Inventor: Henry K. Lee, Clarence, NY (US)

( * ) Notice: Subject to any disclaimer, the term of this patent is extended or adjusted under 35 U.S.C. 154(b) by 801 days.

(21) Appl. No.: 12/378,736

(22) Filed: Feb. 19, 2009

(65) Prior Publication Data

US 2009/0266351 A1    Oct. 29, 2009

Related U.S. Application Data

(60) Provisional application No. 61/125,824, filed on Apr. 29, 2008.

(51) Int. Cl.
*F23G 5/40* (2006.01)
*C10L 5/44* (2006.01)
*C10L 11/06* (2006.01)

(52) U.S. Cl. .......... 110/317; 110/241; 110/346; 44/521; 44/534; 44/535; 44/590

(58) Field of Classification Search .............. 110/165 R, 110/166, 235, 241, 242, 317, 346; 44/530, 44/532, 533, 534, 535, 589, 590, 520, 521, 44/522; 126/25 R, 7, 10, 11, 68, 73, 107, 126/163 A, 168, 500, 501, 506, 519
See application file for complete search history.

(56) References Cited

U.S. PATENT DOCUMENTS

| | | | | |
|---|---|---|---|---|
| 2,789,890 A * | 4/1957 | Stevens | ........................... | 44/534 |
| 3,034,873 A * | 5/1962 | Weir | ............................... | 44/534 |
| 4,414,906 A * | 11/1983 | Hartouni | .......................... | 44/522 |
| 4,539,011 A * | 9/1985 | Kretzschmann | ................ | 44/270 |
| 4,810,255 A * | 3/1989 | Fay et al. | ......................... | 44/530 |
| 4,906,254 A * | 3/1990 | Antosko | .......................... | 44/520 |
| 4,953,533 A * | 9/1990 | Witt | ............................. | 126/25 B |
| 5,070,777 A * | 12/1991 | Novak | ............................. | 99/482 |
| 5,112,365 A * | 5/1992 | MacIsaac et al. | ............... | 44/576 |
| 5,912,192 A * | 6/1999 | Kim et al. | ........................ | 44/530 |
| 6,913,631 B2 * | 7/2005 | Lefevre | ............................. | 44/640 |

* cited by examiner

*Primary Examiner* — Kenneth Rinehart
*Assistant Examiner* — David J Laux
(74) *Attorney, Agent, or Firm* — Ruth Eure

(57) ABSTRACT

A Log Cartridge Burning System is provided comprising a simple, convenient and manageable wood burning system which can easily be applied for use to cook and heat. The log cartridge is comprised of a flammable body of compressed material and a bore formed and sealed by the use of a protective outer paperboard tube and a protective inner paperboard tube together with a top and bottom paperboard cover which serve to hold and maintain the integrity of the entire cartridge without the use of any wax binders. The flammable body of compressed material may be made partly or entirely from natural combustible materials such as sawdust or wheat hulls. The burn pot is specially designed to accommodate the log cartridge of the present invention. The log cartridge burning system can easily be utilized in a variety of appliances such as a patio heater or fireplace, barbecue or grill, or other cooking and heating appliances.

10 Claims, 4 Drawing Sheets

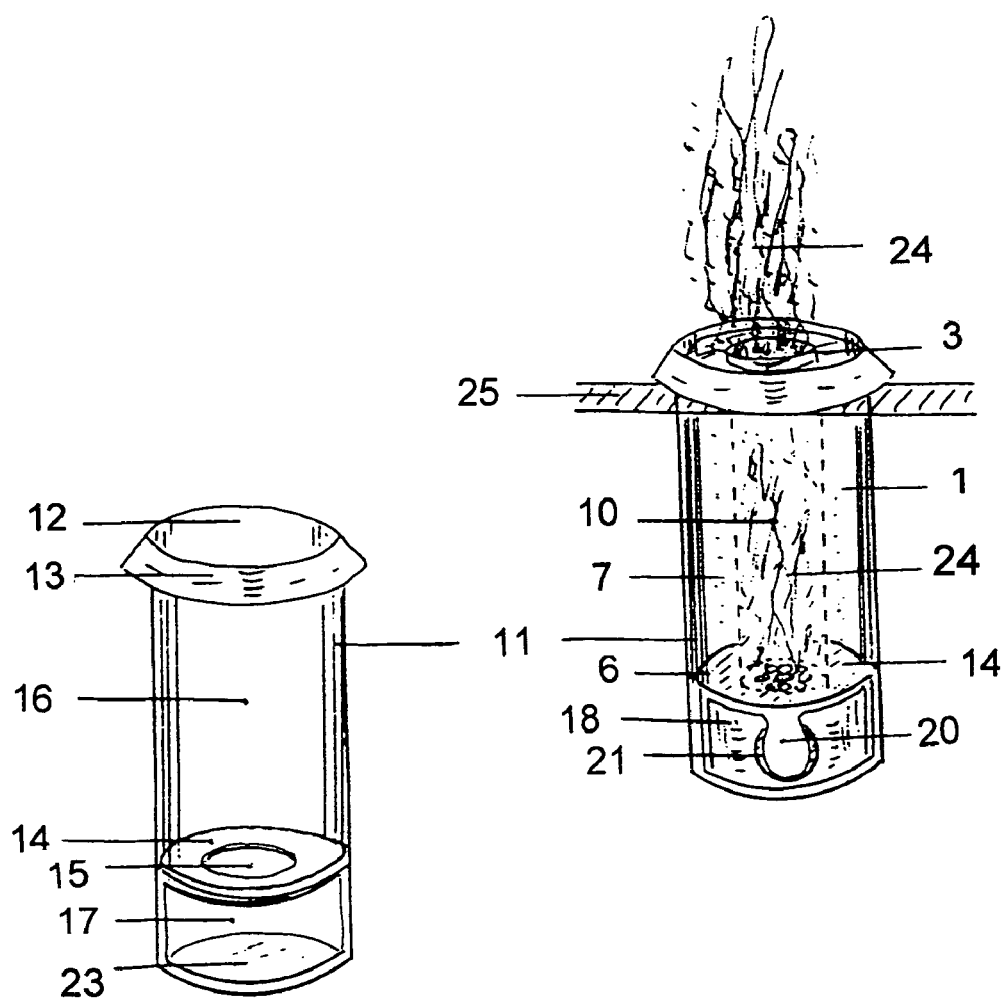
Fig. 4
Fig. 5
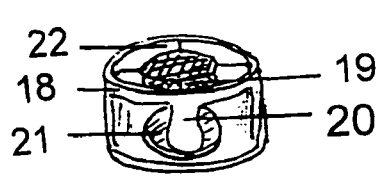
Fig. 6
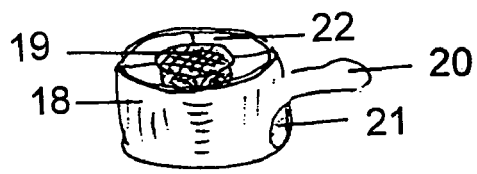
Fig. 7

LOG CARTRIDGE BURNING SYSTEM

CLAIM OF PRIORITY

This patent application claims priority under 35 USC 119 (e) (1) from U.S. Provisional Patent Application Ser. No. 61/125,824, filed Apr. 29, 2008, of common inventorship herewith entitled, "Log Cartridge and Burn Pot."

FIELD OF THE INVENTION

This invention pertains to the field of compressed fuel and compressed fuel combustion chambers.

BACKGROUND OF THE INVENTION

The prior art has put forth a variety of compressed fuel devices, methods and apparata. For example, U.S. Pat. No. 4,414,906 to Hartouni described a Fuel Cartridge and Burner wherein the cartridge is completely enclosed in the combustion chamber.

Another example is found in U.S. Pat. No. 4,243,393 to Christian which describes a coal article comprising coal particles and igniter material having a hollow core to facilitate the combustion of the fuel.

Further examples include:

U.S. Pat. No. 2,222,250, "Fuel Briquette" to Bowling describes a log comprised of biomass having a resinous outer coating.

U.S. Pat. No. 2,833,633, "Apparatus for Forming Logs of Compressible Materials" to Hecht is a mechanized device for compressing sawdust or other material into logs by pressing sequential discs until a log is formed.

U.S. Pat. No. 3,726,651, "Synthetic Fireplace Log" to Ronden describes a log made of charcoal, sawdust and binder material.

U.S. Pat. No. 4,040,796, "Fast Lighting Artificial Firelog" to Vincent and Rauch describes a log made of wood and wax, having a groove along its length and wrapped in paper.

U.S. Pat. No. 4,042,343, "Fire Log Process and Apparatus" to Bernard describes a mechanized device for forming logs from sawdust.

U.S. Pat. No. 4,043,765, "Artificial Fireplace Logs with Ignition Strips" to Tanner describes a log of combustible material, having enhanced combustibility due to the addition of an ignition strip along its length.

U.S. Pat. No. 4,060,396, "Wafered Fuel of Compressed Wood Products" to Burton describes a combustible product having a sequential disc configuration.

U.S. Pat. No. 4,104,034, "Easy Lighting Fireplace Log" to Wu and Barron describe a log having a groove along its length and a single paper covering.

U.S. Pat. No. 4,308,032, "Compacted Sawdust Log and Method and Apparatus for Making the Same" to Benson describes a method of making a sawdust log utilizing a cylindrical form, an inner cylinder wrapped with newspaper, packing the form with sawdust and removing the inner cylinder.

U.S. Pat. No. 4,810,256, "Composite Fuel Article" to Fay and Olszewski describes a log of combustible material having a hole in its center, surrounded by spacing elements and finally wrapped in ignition material.

U.S. Pat. No. 5,573,555, "Down Burning Solid Fuel Body" to Kim and Kim describes a layered fuel body comprising chemicals in addition to the combustible material.

U.S. Pat. No. 5,858,036, "Artificial Fire Log" to Chandaria also describes a log having a groove along its length, as well as a V-shaped channel along its length.

U.S. Pat. No. 5,912,192, "Multi-Layered Solid Combustible Article and Its Manufacture" to Kim and Cirlin describe a log having stratified layers of materials of varying combustibility.

U.S. Pat. No. 4,438,756, "Apparatus and Method for Accomplishing Efficient Burning of Biomass Fuel Materials" to Chamberlain and Tiggs describes a complex stove having a catalytic converter.

U.S. Pat. No. 5,873,356, "High Efficiency Wood Pellet Stove" to Vossler and Tomooka describes a wood pellet stove.

U.S. Pat. No. 7,004,084, "Corner Burner" to Anderson and Anderson describes a corn burner.

None of these prior art references describe the invention of the present application.

Most prior art artificial fuels and fire starters are formed of particulate flammable materials such as sawdust which are coated with or composed of petroleum wax binders or resins and compressed into a predetermined shape for maintaining the desired shape of the final fuel body and for easier igniting. These artificial fuels and fire starters cannot be used for cooking. In contrast, the present invention is useful for cooking.

Some manufactured fuels like wood pellets and pressed logs are made by highly compressed sawdust or wood shavings generally without any binders added. In fact, these fuels are so dense and they are more difficult to start compared to cordwood and they are generally used in a home fireplace or a complicated pellet stove to burn effectively.

SUMMARY OF THE INVENTION

The Log Cartridge Burning System is a simple, convenient and manageable wood burning system which can easily be applied for use to cook and heat. The log cartridge is comprised of a flammable body of compressed material such as sawdust formed and sealed by the use of a protective outer paperboard tube and a protective inner paperboard tube together with a top and bottom paperboard cover which serve to hold and maintain the integrity of the entire cartridge without the use of any wax binders.

The paperboard tubes and top and bottom covers also prevent the damaging and breaking up of the compressed fuel body during handling or shipping and the flying out or falling off of sawdust from the log cartridge. In addition, the paperboard covers also form part of the fuel body and provide a clean, tidy and neat packaging for easy handling and storing.

It is an object of the present invention to provide a log cartridge and burn pot which provides a simple, fast and convenient wood burning technology for use to cook and heat.

It is a further object of the present invention to provide an improved log cartridge comprising compressed saw dust or other compressible, combustible material.

It is a further object of the present invention to provide a burn pot specially designed to accommodate the log cartridge of the present invention.

It is a further object of the present invention to provide a burn pot having a removable ash bucket.

It is a further object of the present invention to provide a log cartridge burning system which can easily be utilized in a variety of appliances such as a patio heater or fireplace, barbecue or grill, or other cooking or heating appliances.

BRIEF DESCRIPTION OF THE DRAWINGS

FIG. 4 is a front perspective view of the burn pot of the present invention showing the burn pot empty.

FIG. 5 is a front perspective view of the burn pot of the present invention showing the burn pot in use.

FIG. 6 is a front view of the ash bucket of the burn pot of the present invention.

FIG. 7 is a side view of the ash bucket of the burn pot of the present invention.

DETAILED DESCRIPTION OF THE INVENTION

Figures 1, 2:
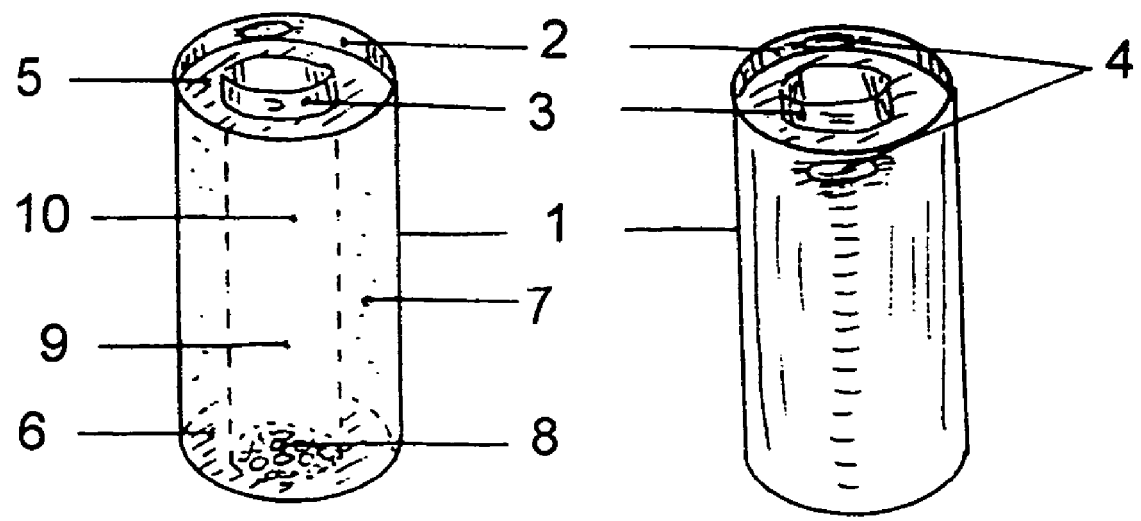
FIG. 1 is a phantom perspective view of the log cartridge of the present invention.
FIG. 2 is a front perspective view of the log cartridge of the present invention.
Figure 3:
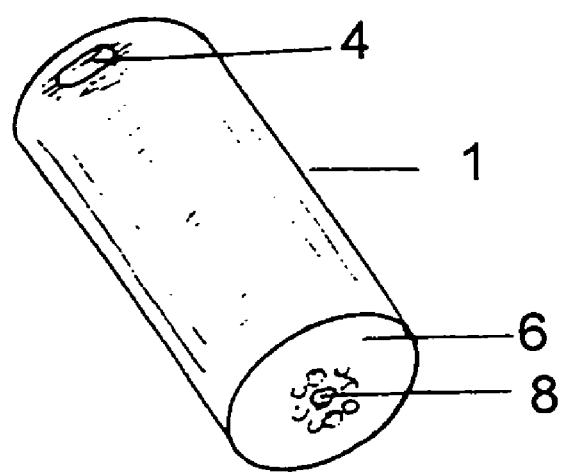
FIG. 3 is a side perspective view of the log cartridge of the present invention.
Figure 8:
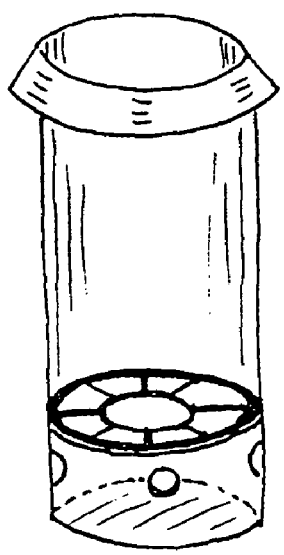
FIG. 8 is a front perspective view of an alternative embodiment of the burn pot of the present invention.
Figure 9:
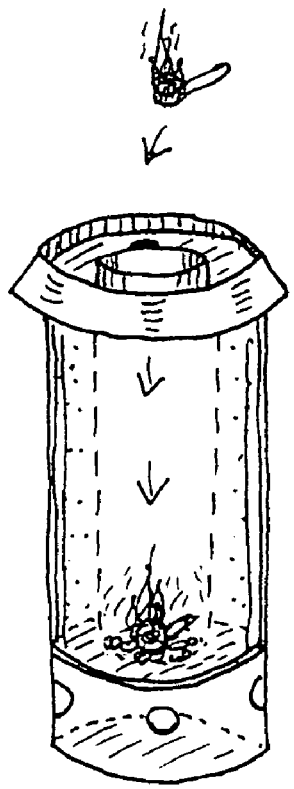
FIG. 9 is a front view showing the log cartridge housed in the burn pot which is ignited by a lighted starting fuel that is dropped by gravity to the bottom end of the log cartridge through the protective inner paper tube.
Figure 10:
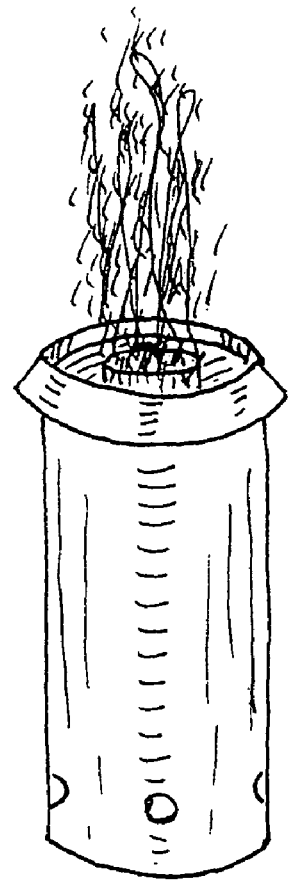
FIG. 10 is a front perspective view of the alternative embodiment of the burn pot in use.
Figure 11:
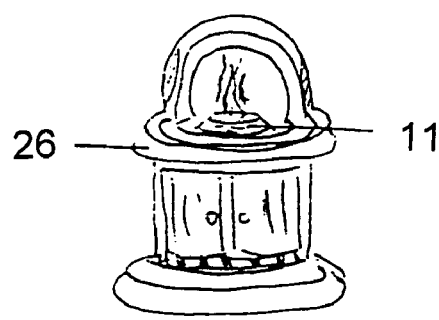
FIG. 11 depicts the present invention in use in a patio heater or fireplace.
Figure 12:
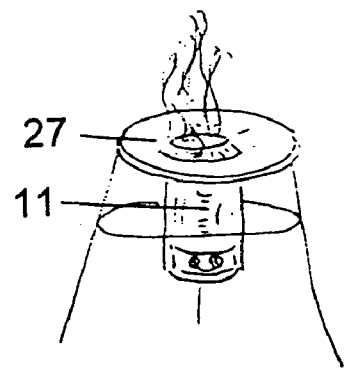
FIG. 12 depicts the present invention in use in a cooking or heating appliance.
Figure 13:
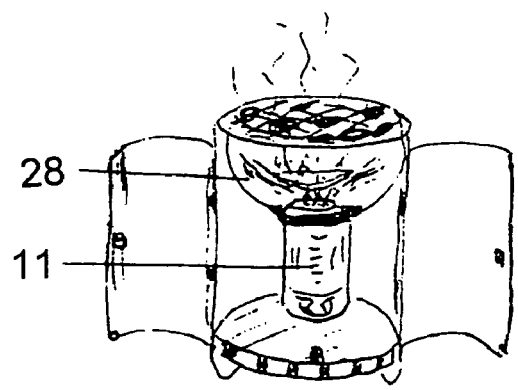
FIG. 13 depicts the present invention in use in a barbecue grill.

To facilitate understanding the present invention, following is a list of drawing elements and their respective numerals.
(1) Log Cartridge
(2) Protective Outer Paper Tube
(3) Protective Inner Paper Tube; where the diameter of the inner paper tube is smaller than the diameter of the outer paper tube and the inner paper tube is positioned inside the outer paper tube
(4) Grab Holes
(5) Top Paperboard Cover
(6) Bottom Paperboard Cover
(7) Compressed flammable material, such as sawdust, which is positioned between the protective outer paper tube and the protective inner paper tube
(8) Ventilation Holes
(9) Internal combustion chamber
(10) Cylindrical central bore formed by the protective inner paper tube
(11) Burn Pot
(12) Top Loading Open End
(13) Broad Rim Mounting Head
(14) Log Cartridge Receiving Plate
(15) Air Intake
(16) Combustion Chamber
(17) Air Chamber
(18) Removable Ash Bucket
(19) Starting Fuel Holder
(20) Ash Bucket Handle
(21) Orifice
(22) Top Open-end
(23) Burn Pot Bottom
(24) Hot Gas/Fire/Smoke
(25) Appliance Not Present
(26) Patio Heater/Fireplace
(27) Cooking/Heating Appliance
(28) Barbecue/Grill A log cartridge 1 having one protective outer paper tube 2 and one protective inner paper tube 3 forms and holds a flammable body of compressed flammable material such as sawdust in between the two said paper tubes. Other suitable flammable materials useful for use in the present invention include: wood shavings, wood chips, palm kernel shells, olive residue, coffee grounds, peanut shells, rice hulls, coal dust, wheat hulls, and other grain hulls, for example.

The top surface of the said compressed sawdust is held in between the two paper tubes and is covered by a protective paperboard cover 5. The upper portions of the protective outer paper tube 2 and the top paperboard cover 5 are pressed together and extend beyond the compressed sawdust to provide a paperboard lip which can accommodate one or more grab holes 4 for grabbing and handling of the cartridge and for controlling the weight of the compressed sawdust body during the compaction forming. The bottom surfaces of the protective outer paper tube 2, the compressed sawdust and the protective inner paper tube 3 are covered by a protective paperboard cover 6 having ventilation holes 8 extending into the internal chamber 9 of the protective inner paper tube 3. Cylindrical central bore 10 functions as internal combustion chamber 9 when the log is burning. When the log is not burning, internal combustion chamber 9 is equivalent to bore 10.

When the bottom paperboard cover 6 is ignited, it burns through the ventilation holes 8 and ignites the protective inner paper tube 3 so as to ignite the flammable body of compressed sawdust as well.

A cylindrical, free-standing burn pot 11 for housing the log cartridge 1 has a top loading open-end 12 and a broad rim mounting head 13 which allows the burn 11 pot to easily be inserted, attached, mounted or dismounted into an appliance for use to cook or heat. A log cartridge receiving plate 14 having an air intake 15 forms the combustion chamber 16 and the air chamber 17 extending from the bottom of the burn pot 11.

In an embodiment, the air chamber 17 may have an open entrance at side of the burn pot to receive removable ash bucket 18. Removable ash bucket 18 is sized to fit inside air chamber 17 and has an open end to receive ash. Removable ash bucket 18 also houses a starting fuel holder 19 for receiving a starting fuel mounted at the center of the bucket 18 facing the air intake 15 of the log cartridge receiving plate 14. Starting fuel holder 19 is made of screen, net or wire mesh, to allow maximum air flow to enhance the burning of the starting fuel. Any suitable solid starting fuel or kindling can be used, including, but not limited to: wax and sawdust fire starters, wood chips, newspaper balls, or even potato chips, for example.

The ash bucket 18 has a handle 20 and an orifice 21 from an external surface thereof which allows air or draft to go into the combustion chamber 16 of the burn pot 11 through the air chamber 17, the starting fuel holder 19 and the air intake 15 of the log cartridge receiving plate 14 during the combustion of the log cartridge 1.

When a log cartridge 1 is in place in the combustion chamber 16 of the burn pot 11 and the bottom paperboard cover 6 of the cartridge 1 is ignited by a flame source contained in the starting fuel holder 19 in the ash bucket 18, combustion of the log cartridge 1 occurs.

The flame source starts the burning of the bottom paperboard cover 6 which burns through the ventilation holes 8 and ignites the protective inner paper tube 3 as well. Hot gas, smoke and fire 24 fill bore 10 within the ignited inner paper tube 3 which burns out and ignites the flammable body of compressed sawdust. Hot gas, smoke and fire 24 quickly travel up the bore 10 due to the rise of the temperature that creates a draft which draws combustion air into the combustion chamber and into the bore 10 of the compressed sawdust body through the air intake 15, the air chamber 17, the starting fuel holder 19 and the orifice 21 of the ash bucket 18 and expels the hot gas, smoke and fire out the top of the burn pot. The ignition of material in bore 10 of the compressed sawdust body combines with the draft and accelerates burning of the compressed sawdust body with an effect like a chimney fire. The stronger the draft going in and traveling up within the bore 10, the hotter the gas and fire are rushing out.

The burning heat within the bore 10 radiates gradually by consuming the fuel energy of the flammable material of the compressed sawdust. The burn time can last from one to over ten hours, depending on the size and the compaction density of the compressed sawdust body and flow of air.

The entire sawdust body eventually becomes a red-hot body which ignites the protective outer paper tube 2 with hot gas and fire which keep rushing out until all the fuel energy including the sawdust, the paper tubes 2 and 3 and the paperboard covers 5 and 5 are completely consumed. The remainder of the fuel energy stays at a high temperature for a long time until they collapse and leave behind a small bundle of ashes inside the burn pot. The ashes can easily be removed by pouring out from the ash bucket 18 when they are completely cooled down.

A new line of wood-fired barbecue, grill, campfire, patio heater, fireplace and cooking & heating appliances, accessories and products can easily be developed and built based on the convenience, effectiveness, efficiency and functionality of the log cartridge and burn pot.

The log cartridge is a one-time use consumable product made of natural wood fiber or sawdust without the use of any additives, petroleum wax or chemical binders.

The protective inner paper tube 3 serves to form the bore 10 of the flammable body of compressed sawdust and functions as a lining to facilitate combustion of the flammable body of compressed sawdust as well.

The burn pot is a simple, effective and efficient instrument which requires no electricity and mechanical moving parts to work with. It is reusable, top-mounting and freestanding on any flat solid ground.

Although this invention has been described with respect to specific embodiments, it is not intended to be limited thereto and various modifications which will become apparent to the person of ordinary skill in the art are intended to fall within the spirit and scope of the invention as described herein taken in conjunction with the accompanying drawings and the appended claims.

The invention claimed is:

1. A log cartridge burn pot comprising an essentially cylindrical vessel having sidewalls and a bottom, further comprising:
   a) a top loading open-end for receiving a log cartridge;
   b) a broad rim mounting head;
   c) a receiving plate having an air intake;
   d) a combustion chamber formed by the receiving plate and the sidewalls of the essentially cylindrical vessel;
   e) an air chamber formed by the bottom of the vessel, the sidewalls of the vessel and the receiving plate, further comprising:
   an opening in the side of the air chamber to receive a removable ash bucket; wherein the removable ash bucket is sized to fit inside the air chamber, and further comprising an open top end to receive ash.

2. The log cartridge burn pot of claim 1 wherein the removable ash bucket further comprises a mesh holder for receiving a starting fuel, wherein the mesh holder is mounted at the center of the bucket.

3. The log cartridge burn pot of claim 2, wherein the ash bucket further comprises a handle and an orifice which allows air to enter the combustion chamber.

4. The log cartridge burn pot of claim 2 wherein the starting fuel is selected from the group consisting of:
   any suitable solid starting fuel or kindling, wax and sawdust fire starters, wood chips, newspaper balls, and potato chips.

5. An essentially cylindrical log cartridge comprising:
   a) protective outer paper tube;
   b) protective inner paper tube, where the diameter of the protective inner paper tube is smaller than the diameter of the protective outer paper tube and the protective inner paper tube is positioned inside the protective outer paper tube;
   c) compressed combustible material placed in the space between the protective outer paper tube and the protective inner paper tube;
   d) an internal chamber bore defined by the protective inner paper tube;
   e) top paperboard cover, wherein the protective outer paper tube and the top paperboard cover are pressed together and extend beyond the compressed combustible material to provide a paperboard lip to accommodate one or more grab holes for grabbing and handling the cartridge and for controlling the weight of the compressed combustible material during compaction; and
   f) bottom paperboard cover having ventilation holes.

6. The log cartridge of claim 5 wherein the compressed combustible material is sawdust.

7. The log cartridge of claim 6, wherein the combustible material is selected from the group consisting of:
   wood shavings, wood chips, palm kernel shells, olive residue, coffee grounds, peanut shells, rice hulls, coal dust, wheat hulls, and other grain hulls.

8. A log cartridge burning system comprising:
   A. a log cartridge comprising:
   a) protective outer paper tube;
   b) protective inner paper tube, where the diameter of the protective inner paper tube is smaller than the diameter of the protective outer paper tube and the protective inner paper tube is positioned inside the protective outer paper tube;
   c) compressed sawdust placed in the space between the protective outer paper tube and the protective inner paper tube;
   d) an internal chamber bore defined by the protective inner paper tube;
   e) top paperboard cover; and
   f) bottom paperboard cover; and
   B. a log cartridge burn pot comprising an essentially cylindrical vessel having sidewalls and a bottom, further comprising:
   a) a top loading open-end for receiving a log cartridge;
   b) a broad rim mounting head;
   c) a receiving plate having an air intake;
   d) a combustion chamber formed by the receiving plate and the sidewalls of the essentially cylindrical vessel;
   e) an air chamber formed by the bottom of the vessel, the sidewalls of the vessel and the receiving plate;
   f) an opening in the side of the air chamber to receive a removable ash bucket; wherein the removable ash bucket is sized to fit inside the air chamber, and further comprising an open top end to receive ash;

g) wherein the removable ash bucket further comprises a mesh holder for receiving a starting fuel, wherein the mesh holder is mounted at the center of the ash bucket;

h) wherein the ash bucket further comprises a handle and an orifice which allows air to enter the combustion chamber.

9. The log cartridge burning system of claim 8 wherein the combustible material is selected from the group consisting of: wood shavings, wood chips, palm kernel shells, olive residue, coffee grounds, peanut shells, rice hulls, coal dust, wheat hulls, and other grain hulls.

10. The log cartridge burning system of claim 8 wherein the starting fuel is selected from the group consisting of:
any suitable solid starting fuel or kindling, wax and sawdust fire starters, wood chips, newspaper balls, and potato chips.

* * * * *